(12) United States Patent  
Castiel

(10) Patent No.: US 6,249,672 B1  
(45) Date of Patent: Jun. 19, 2001

(54) PORTABLE TELEPHONE

(75) Inventor: David Castiel, Washington, DC (US)

(73) Assignee: Mobile Communications Holdings, Inc., Washington, DC (US)

( * ) Notice: Subject to any disclaimer, the term of this patent is extended or adjusted under 35 U.S.C. 154(b) by 0 days.

(21) Appl. No.: 09/272,849

(22) Filed: Mar. 19, 1999

(51) Int. Cl.[7] .................................................. H04B 1/38
(52) U.S. Cl. ........................ 455/90; 455/90; 455/550; 455/575; 379/433; D14/137; D14/138
(58) Field of Search .......................... 455/575, 90, 566, 455/550, 425, 412, 413; 379/428, 431, 433, 434; D14/137, 138

(56) References Cited

U.S. PATENT DOCUMENTS

| | | | |
|---|---|---|---|
| D. 291,990 | * | 9/1987 | Lee ........................................ D14/53 |
| D. 434,403 | * | 11/2000 | Jaynes et al. ....................... D14/138 |
| 5,151,946 | * | 9/1992 | Martensson ............................ 379/38 |
| 5,436,954 | * | 7/1995 | Nishiyama et al. .................... 379/58 |
| 5,444,866 | * | 8/1995 | Cykiert .................................. 455/89 |
| 5,450,619 | * | 9/1995 | Meada .................................. 455/89 |
| 5,818,701 | * | 10/1998 | Shindo ................................ 361/814 |
| 5,898,758 | * | 4/1999 | Rosenberg ............................ 379/57 |
| 5,933,778 | * | 11/2000 | Buhrman et al. .................... 455/461 |
| 5,956,625 | * | 9/1999 | Hansen et al. ........................ 455/90 |
| 6,006,103 | * | 12/1999 | Van Lerberghe .................... 455/550 |

FOREIGN PATENT DOCUMENTS

| | | |
|---|---|---|
| 0 647 037 A1 | 4/1995 | (EP) . |
| 0 871 148 A2 | 10/1998 | (EP) . |
| 0 881 810 A1 | 12/1998 | (EP) . |
| 98/16047 | 4/1998 | (WO) . |
| 98/27704 | 6/1998 | (WO) . |
| 99/27700 | 6/1999 | (WO) . |

* cited by examiner

*Primary Examiner*—William Trost  
*Assistant Examiner*—Conguan Tran  
(74) *Attorney, Agent, or Firm*—Fish & Richardson P.C.

(57) ABSTRACT

An elliptically shaped cellular phone is elliptical in both the front access, the bottom access and the side access. This elliptical shape enables the telephone to be more easily carried in pocket for example. The telephone includes two slidable modules which are string biased relative to one another. Opening the telephone enables answering and closing the telephone enables hanging up. Even when the telephone is closed, however, one part of the keyboard is still accessible. That part of the keyboard can be used to carry out various functions on an incoming call. One function is blocking the call from passing to voice mail.

17 Claims, 4 Drawing Sheets

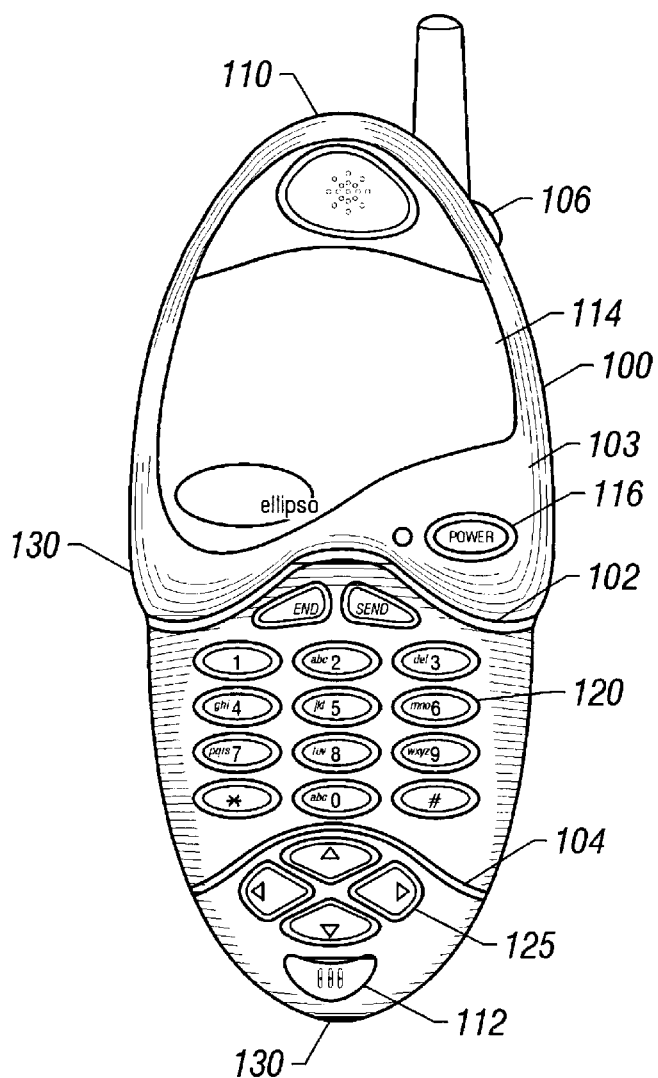
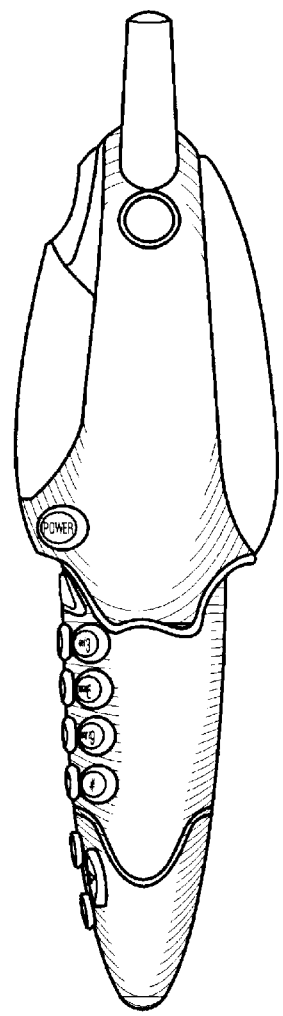
FIG. 1A  FIG. 1B
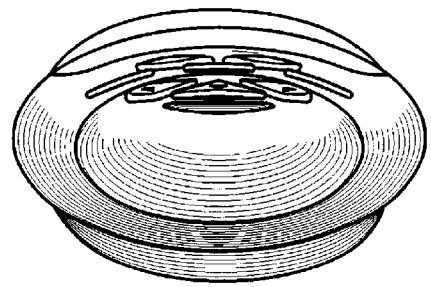
FIG. 1C

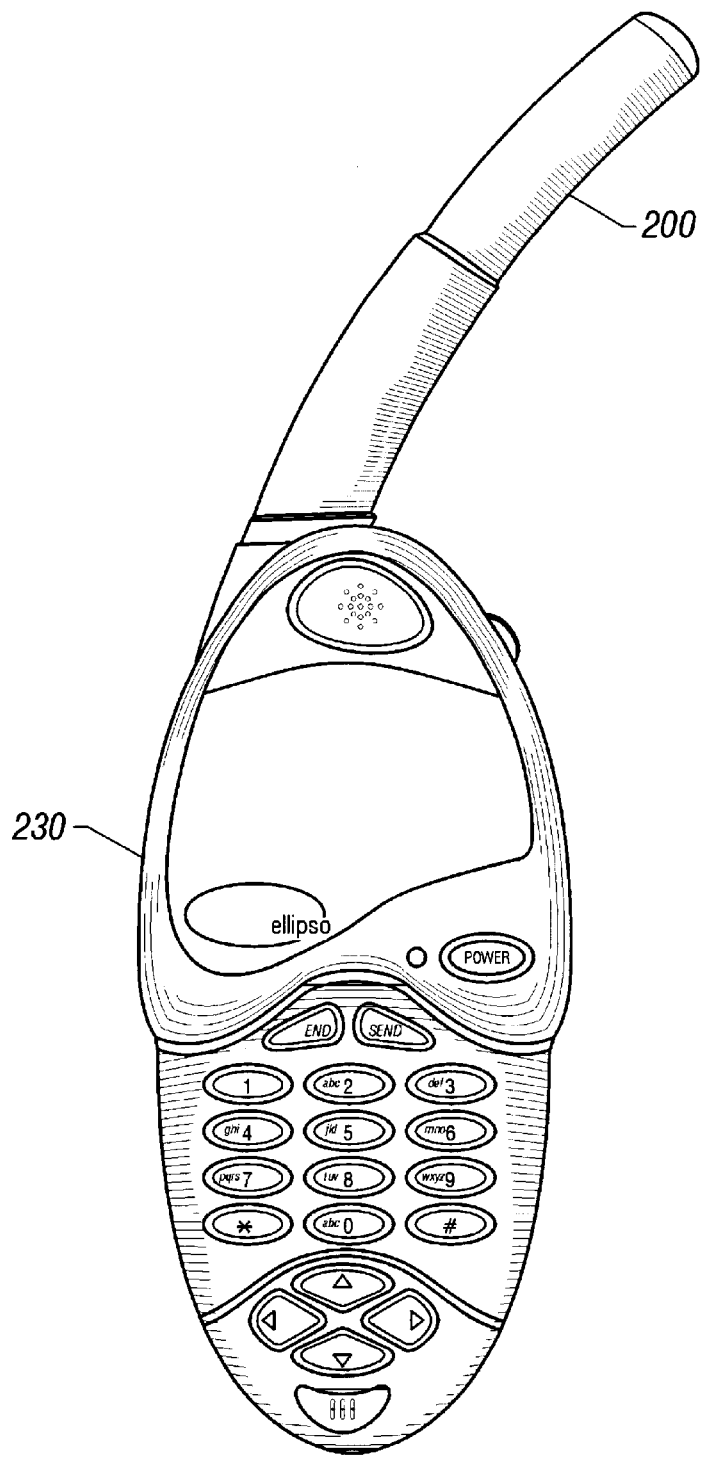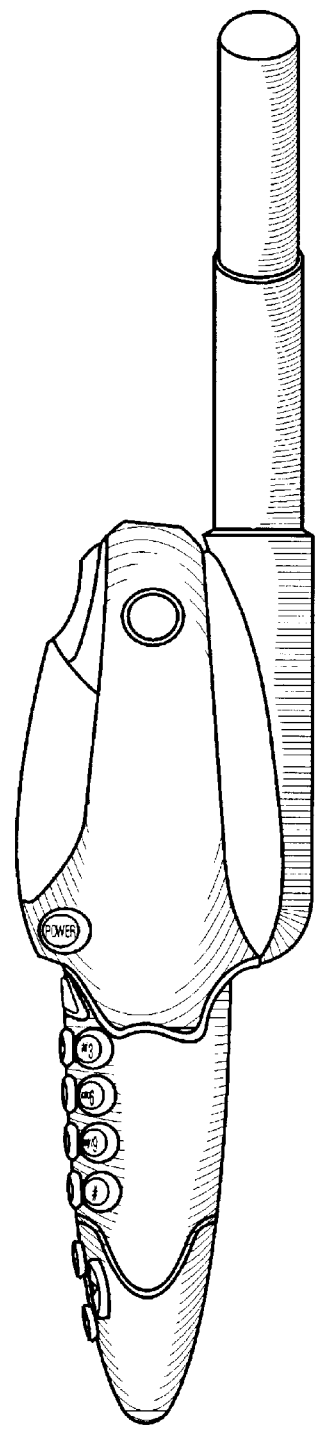
FIG. 2A                                FIG. 2B

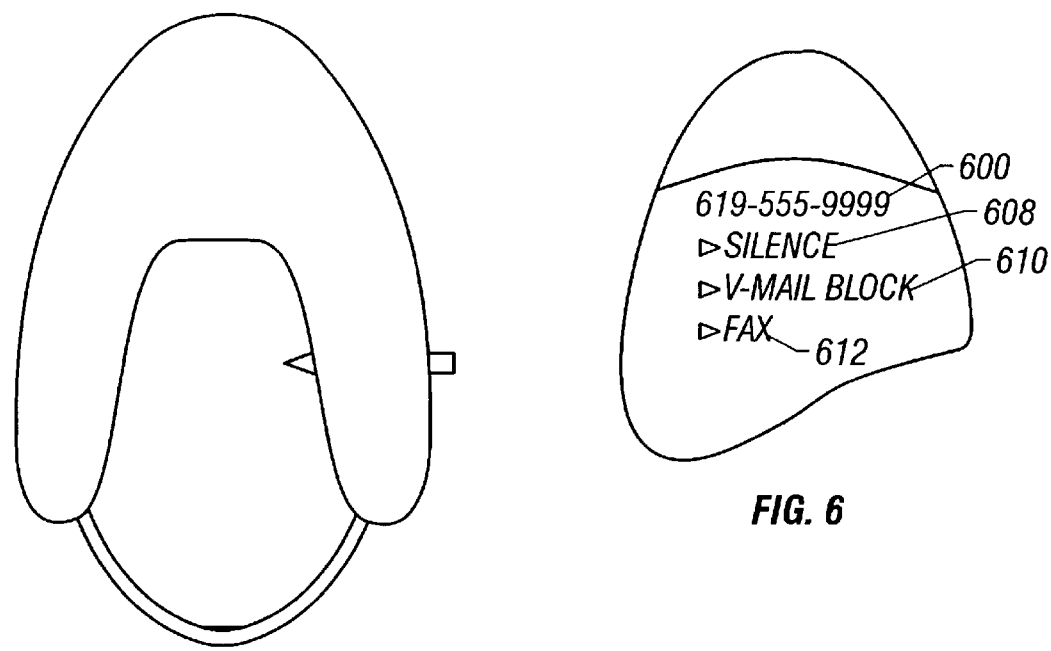
FIG. 5
FIG. 6
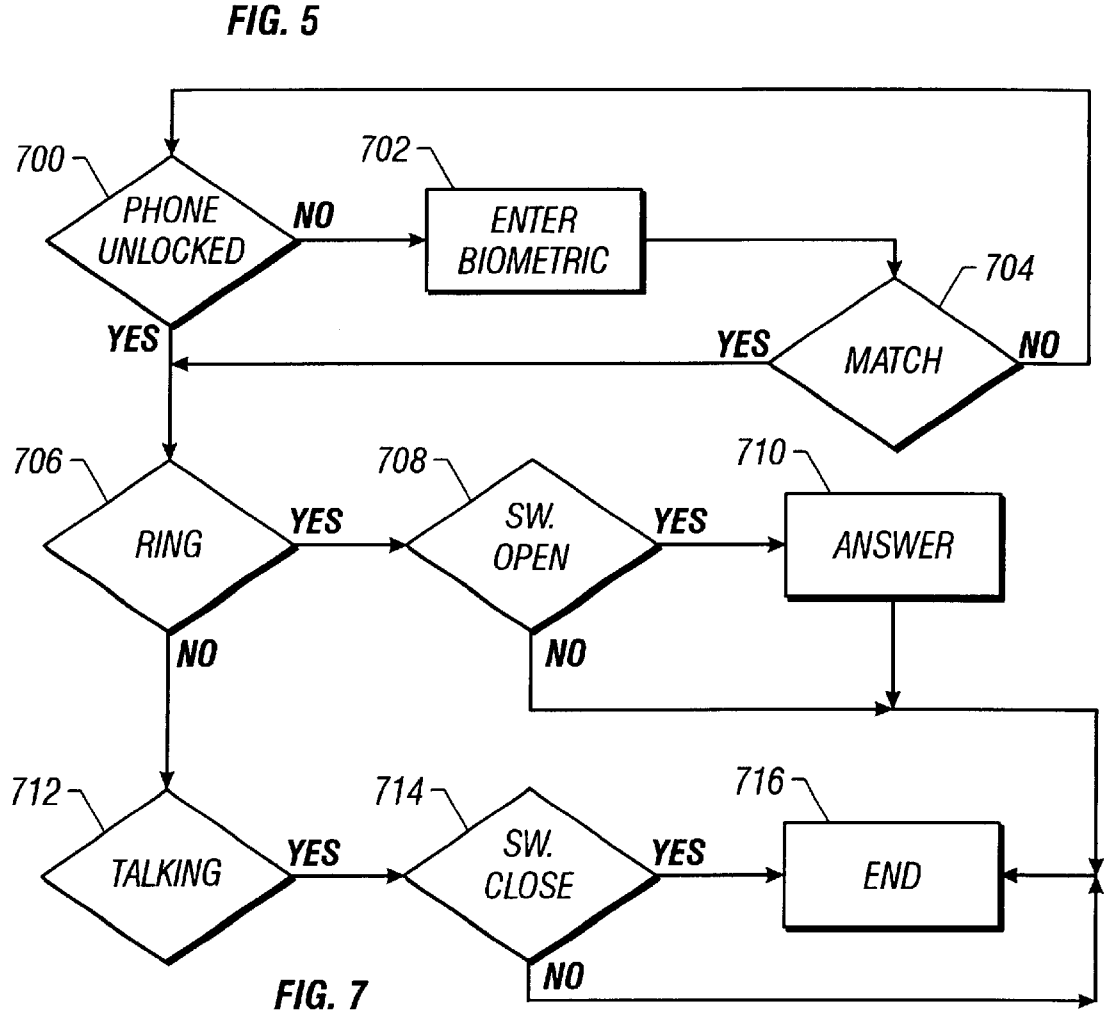
FIG. 7

PORTABLE TELEPHONE

BACKGROUND

Portable telephones, such as cellular telephones, must have a way of activating and deactivating the telephone. It is also desirable to make the telephone as small as possible. However, a certain distance between the earpiece and mouthpiece is useful to enable the telephone to extend from the user's ear to the user's mouth. Telephones, such as the Motorola flip-phone series, have conventionally pivoted into the open position to extend this distance. In addition, the telephone has often used the opening operation to control answering the call, and conversely used the closing operation to control ending the call.

Other systems are known which use a sliding portion. For instance, the Qualcomm sliding ear piece telephone allows the ear piece to extend. When the ear piece is down, however, the telephone is totally locked. It cannot make or receive calls, nor use any of the keyboard functions.

SUMMARY

The present system defines a new way of packaging cellular electronics. This system includes an elliptically-shaped telephone which has one electronics module that slides relative to the other electronics module to compress the cellular telephone's overall outer size. The device includes two keyboards, including a first keyboard which is physically blocked by the compressing of the telephone, and a second keyboard which is still accessible after the compressing. Hence, the telephone is still usable even when compressed. It can be extended to answer and to provide full functionality.

A spring-loaded mechanism biases the modules apart. The release button releases the modules and hence enables answering an incoming call. Conversely, compressing the telephone hangs up a call in progress.

BRIEF DESCRIPTION OF THE DRAWINGS

These and other aspects will now be described with reference to the accompanying drawings, wherein:

FIGS. 1A–1C respectively show front, side and bottom views of the first preferred mode in the cellular phone configuration.

FIGS. 2A and 2B show front and side views of the second preferred mode in the satellite phone configuration, with the optional antenna clipped on.

FIG. 5 shows the cut away of the telephone in the contracted position;

FIG. 6 shows the menu; and

FIG. 7 shows a flowchart of operation of the telephone's processor.

DESCRIPTION OF THE PREFERRED EMBODIMENTS

Figure 3:
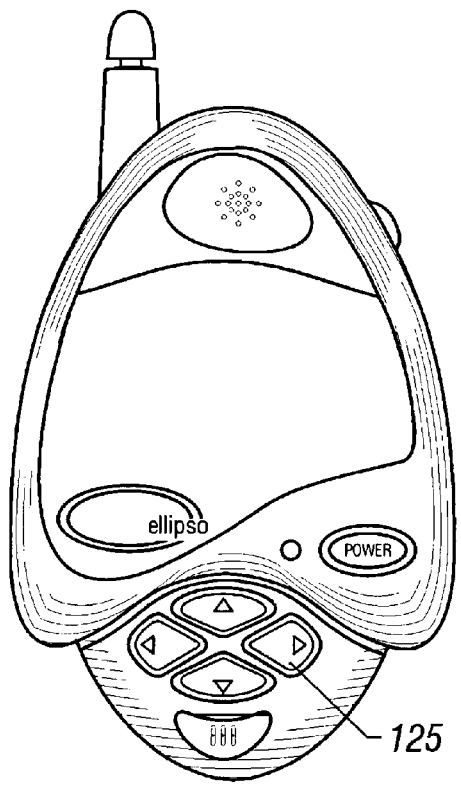
FIG. 3 shows a view of the preferred mode in the folded position.

The overall front view of the telephone in its extended position is shown in FIG. 1A. FIGS. 1B and 1C respectively show a side view and a bottom view of the telephone package. The telephone housing 100 is formed of a generally elliptical outer shape in two orthogonal planes. The front on view of the telephone in FIG. 1A shows that it is elliptical in that flat on plane view. The bottom view of the telephone in FIG. 1C shows that the outer housing is elliptical in outer shape from that view also. The telephone package 100 is also elliptical from the side view as shown in FIG. 1B. In this most preferred mode, the telephone is elliptical in all planes.

The telephone has two modules 102, 104 which slide relative to one another. Each module includes different electronics. At least one of the modules is mounted on a slide, and is spring-biased into the open position. For example, module 102 can be movable. The modules collapse to the position shown in FIG. 3. In this position, the spring is tensioned, but the two modules are held by a latch 400, 401. Release button 106 releases the latch and causes the phone to automatically extend to its expanded state shown in FIG. 1.

The telephone includes, as is conventional, an ear portion 110, a mouthpiece 112, and a display 114. Power switch 116 controls turning on and off the telephone's main power.

This telephone also includes two physically-separated keyboard parts, a first part 120 including a 10-key keyboard as well as a TALK button to initiate a connection and an END button to end a connection. A second keyboard part 125 includes arrow keys. FIG. 3 shows that the second keyboard 125 is not covered even when the cellular phone is collapsed into its collapsed position. In that position, both the POWER button and the ARROW keys are still exposed and usable.

The slidable module 102 is not just a cover, but in fact includes electronic portions. Module 102 includes the menu 114 which displays information, and also holds the logo portion 130. Logo portion 130 preferably includes a biometric recognition chip behind it which recognizes some aspect that is individual to the user of the telephone. In the embodiment shown in FIG. 1, the biometric recognition is a fingerprint recognizer chip. This device automatically obtains a fingerprint, and validates the fingerprint against a stored database of acceptable printsand determines certain aspects about that fingerprint from its own internal operations.

A second mode uses a voice recognition chip as the biometric recognizer, which obtains a user's voice print, and compares the voice print to a prestored voice print. The FIG. 2 embodiment shows a voice recognition chip 230 being used, with holes in the upper surface 103 of the first portion 102 that allow sound to enter and be accumulated by the voice recognition chip.

The housing 100 also holds the communication electronics 450, which includes at least a transceiver that carries out the RF communication. In the satellite embodiment, a satellite RF transceiver would be used.

The microprocessor of the telephone then optionally allows the phone to be used only when the acquired information matches the stored information. This can be selected.

A particularly preferred mode of this system is its oval outer shape. The inventor recognized that many people want to hold the cellular telephone in their pocket. Typical cellular telephones include edges. The rounded edges of the oval, especially when collapsed, as shown in FIG. 3, can provide fewer pointed edges.

Figure 4:
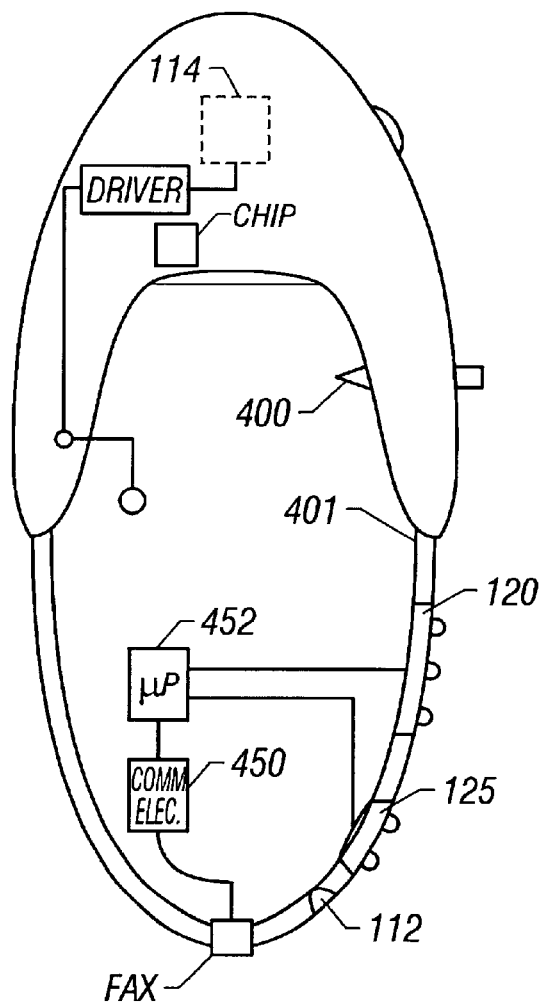
FIG. 4 shows a cutaway view of the telephone from the side, in the unfolded position showing internal components.

The system as shown herein also enables both ending a cell and also answering a call one-handed. FIG. 4 shows a cross-section of a cutaway view of the telephone. The module 102 slides relative to the module 104. A spring 400 spring-biases the module 102 relative to the module 104 so that the module 102 automatically moves to the open position when released. The latch shown as element 420 holds the device in the open position by coupling against a corresponding holding portion 422 and the sliding module 102. Depressing the button 106 moves the latch shown in the direction shown by arrow 424, and thereby allows the sliding module 102 to move in the direction 426 and release the tension on the spring.

A switch 428 is connected to the module 102, and is actuated when the module is in the closed position. Certain actions occur based on the condition of this switch. Changes in the position of the switch are interpreted by the processor. An "open" position (yes at 708) during ringing (yes at 706) tells the processor 452 to "answer the call" 710. A close indication during a call (yes at 714) tells the processor to hang up (716).

However, even when the keyboard is collapsed, the second keyboard 125 is still active. This allows certain actions when the caller ID appears on the menu screen 114. The caller ID is displayed at the top of the menu screen, bringing up a menu as shown in FIG. 6.

This menu includes "silence", which stops the phone from ringing.

The second option, shown as 610, is voice mail block, which prevents the call from going to voice mail. This way, the caller cannot leave a voice mail. The user may want to block voice mail and therefore the telephone owner has no voice mail to return.

Fax mode commands the cellular electronics 450 to reconfigure the path of the received signal; and thereby produce an output on the fax connector 452.

In operation, if the telephone rings when collapsed, first, the display of FIG. 6 appears on the display. The user then has choices of selecting one of the options on the menu, e.g. options 608–612, or answering the call. The call can be answered by depressing the button 106 thereby causing the telephone to extend, actuating the switch 428 which commands the telephone to answer.

Similarly, once the call is ongoing, the user can hang up by contracting the module 102 relative to the module 104. A special pressing surface 130 of the telephone defines has a rounded surface which can be pressed for example against the user's knee while the user holds. This actuates the switch 428 which commands the cellular electronics 450 to end the call.

Satellite telephones often require special kinds of antennas which are relatively thick.

FIG. 4 shows a braid antenna 452 being used as part of the antenna. This braid antenna is also electrically connected to a clip portion 454. The clip portion 454 enables clipping on an additional antenna a shown in FIG. 2. A curved telescoping antenna can be clipped on to improve the reception.

Although only a few embodiments have been described in detail above, other embodiments are contemplated by the inventor and are intended to be encompassed within the following claims. In addition, other modifications are contemplated and are also intended to be covered.

For example, while this describes the module 102 being the sliding module, of course 104 could similarly slide.

What is claimed:

1. A portable telephone, comprising:
   a communication electronics, including a transceiver adapted for wireless communication;
   a processor, operating to control at least some aspect of said communication;
   a user interface, connected to control an operation of said microprocessor; and
   a housing, holding at least a portion of said user interface, said housing having a substantially elliptical outer shape which has an elliptical symmetric shape in three orthogonal planes.

2. A telephone as in claim 1 wherein said housing includes a first housing part and a second housing part, and a slide mechanism which allows said first housing part to move relative to said second housing part.

3. A telephone as in claim 2 wherein said first housing part further includes a display screen thereon, and said second housing part includes at least one keyboard thereon.

4. A telephone as in claim 2 wherein said user interface includes a first keyboard part and a second keyboard part, said first keyboard part located in a position where sliding said first housing part relative to said second housing part can cover said first keyboard part, and said second keyboard part located in a position where it will always be accessible.

5. A telephone as in claim 2 further comprising a spring bias element, and a latch, biasing said first and second housing parts into an open position, said latch holding said first and second housing parts in said closed position when closed and further comprising a latch release which when actuated allows said first and second housing parts to spring into said open position.

6. A telephone as in claim 1 further comprising a biometric recognition element, located on said housing.

7. A telephone as in claim 4 wherein said second keyboard is operative to allow certain functions to be carried out even when said housing is compressed.

8. A telephone as in claim 7 further comprising a switch responsive to an open/closed position of said telephone, and wherein an opening of said telephone during a call ringing causes said call to be answered, and a closing operation during a call ringing causes a hang up.

9. A portable telephone, comprising:
   a communication electronics, including a transceiver adapted for wireless communication;
   a processor, operating to control at least some aspect of said communication;
   a user interface, connected to control an operation of said microprocessor; and
   a housing, holding at least a portion of said user interface, said housing having a substantially elliptical outer shape;
   wherein said housing includes a first housing part and a second housing part, and a slide mechanism which allows said first housing part to move relative to said second housing part; wherein said user interface includes a first keyboard part and a second keyboard part, said first keyboard part located in a position where sliding said first housing part relative to said second housing part can cover said first keyboard part, and said second keyboard part located in a position where it will always be accessible;
   wherein said second keyboard is operative to allow certain functions to be carried out even when said housing is compressed; and
   wherein said processor is operative to display a menu upon call ringing while said phone is in said closed position.

10. A telephone as in claim 9 wherein said menu includes a voice mail blocking option.

11. A telephone as in claim 9 wherein said menu includes at least a silence option, a voice mail block option, and a fax option.

12. A telephone as in claim 9 wherein said housing has said elliptical outer shape in two orthogonal planes.

13. A telephone as in claim 9 wherein said housing has said elliptical outer shape in three orthogonal planes.

14. A portable telephone, comprising:
- a communication electronics, including a transceiver adapted for wireless communication;
- a processor, operating to control at least some aspect of said communication;
- a user interface, connected to control an operation of said microprocessor; and
- a housing, holding at least a portion of said user interface, said housing having a substantially elliptical outer shape; and
- a display, and wherein said processor is programmed to display options on said display, one of said options including a voice mail blocking option during a time that a call is ringing.

15. A telephone as in claim 1 further comprising a cellular type antenna, connected to said communication element.

16. A telephone as in claim 1 further comprising a satellite type antenna connected to said communication element.

17. A portable telephone, comprising:
- a wireless communication element;
- a processor;
- a hoursing, holding said communication element and said processor said housing having a substantially elliptical outer shape which has an elliptical symmetric shape in three orthogonal planes; and
- a user interface, connected to said housing, said housing including first and second moving parts, which in a first position are compressed and in a second position are uncompressed, said user interface including two keyboard parts, including a first keyboard part which is accessible both when said housing is compressed and when said housing is uncompressed, and a second keyboard part which is accessible only when said housing is uncompressed wherein said user interface includes an element which enables controlling whether a call can be answered by voice mail when a call is incoming.

\* \* \* \* \*